(12) United States Patent
Bustamante et al.

(10) Patent No.: US 7,872,946 B1
(45) Date of Patent: Jan. 18, 2011

(54) AUTONOMOUS WATERPROOF ELECTRONIC SIGNALING DEVICE

(76) Inventors: Michael John Bustamante, 1501 Plantation Dr., Southlake, TX (US) 76092; Brian A. Amond, 1401 Plantation Dr., Southlake, TX (US) 76092; Anthony M. Scott, 103 Braddock Ct., Southlake, TX (US) 76092; Paul W. Fulbright, 2003 J J Pearce Dr., Richardson, TX (US) 75081-5447

( * ) Notice: Subject to any disclaimer, the term of this patent is extended or adjusted under 35 U.S.C. 154(b) by 990 days.

(21) Appl. No.: 11/010,780

(22) Filed: Dec. 13, 2004

Related U.S. Application Data

(60) Provisional application No. 60/528,677, filed on Dec. 11, 2003.

(51) Int. Cl.
*H04B 11/00* (2006.01)
(52) U.S. Cl. ................ 367/134; 367/142; 367/151
(58) Field of Classification Search ........... 367/137, 367/134, 138, 151, 142
See application file for complete search history.

(56) References Cited

U.S. PATENT DOCUMENTS

| | | | | |
|---|---|---|---|---|
| 3,351,901 A | * | 11/1967 | Padberg, Jr. | 367/151 |
| 3,620,326 A | * | 11/1971 | Hogge | 367/902 |
| 4,604,737 A | * | 8/1986 | Hoffman | 367/134 |
| 4,823,384 A | * | 4/1989 | Lindsay | 379/441 |
| 5,010,529 A | * | 4/1991 | Maynus | 367/137 |
| 5,185,549 A | * | 2/1993 | Sullivan | 310/334 |
| 5,726,396 A | * | 3/1998 | Erath | 181/152 |

OTHER PUBLICATIONS

Nave, Dr. C. Rod. Georgia State University, Dec. 7, 2003, Hyper Physics Website—Sound and Heating, http://web.archive.org/web/20031207003155/hyperphysics.phy-astr.gsu.edu/hbase/sound/maxsens.html.*
Brooker, Dr. Graham. *Sensors and Signals*. 2006. p. 212.
See http://www.acfr.usyd.edu.au/teaching/4th-year/mech4721-Signals/material/lecture%20notes/01%20Introduction.pdf for reference information.
See http://www.acfr.usyd.edu.au/teaching/4th-year/mech4721-Signals/material/lecture%20notes/09%20Propagation.pdf p. 212 for actual reference.
See *Sensors and Signals* by Dr. Graham Brooker (Chapter 9, Section 6, p. 212—Propagation Effects—Attenuation of Acoustic Waves in Water); *Sensors and Signals* by Dr. Graham Brooker, 2006, Australian Centre for Field Robotics, University of Sydney, Australia.
Nave, Dr. C. Rod. Georgia State University. 2005. *Hyper Physics Website*—Sound and Hearing http://hyperphysics.phy-astr.gsu.edu/hbase/sound/maxsens.html, The following chart is an additional reference: C4, 261.625 Hz, Middle C, C5, 523.250 Hz, C above Middle C, C6, 1046.500 Hz, C above C5, C7 2093.000 Hz, C above C6.
http://www.phy.mtu.edu/~suits/notefreqs.html
http://en.wikipedia.org/wiki/Pitch_(music).

* cited by examiner

*Primary Examiner*—Dan Pihulic

(57) ABSTRACT

The autonomous waterproof electronic signaling device disclosed comprises an activator; a signal emitter, said signal emitter to emit a primary signal upon activation of said activator, said signal emitter comprising one or more of the following: a hydrophone, a siren, a speaker, or a transducer; and a head assembly, said head assembly positioned so as to alter at least a portion of said primary signal producing a notification signal.

28 Claims, 15 Drawing Sheets

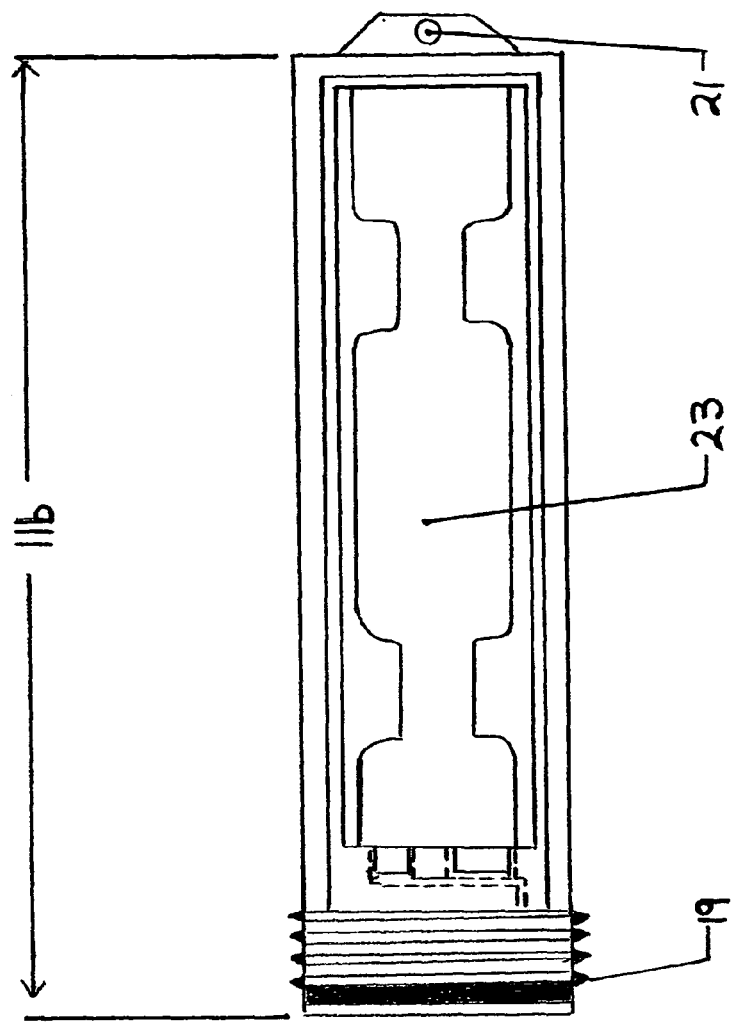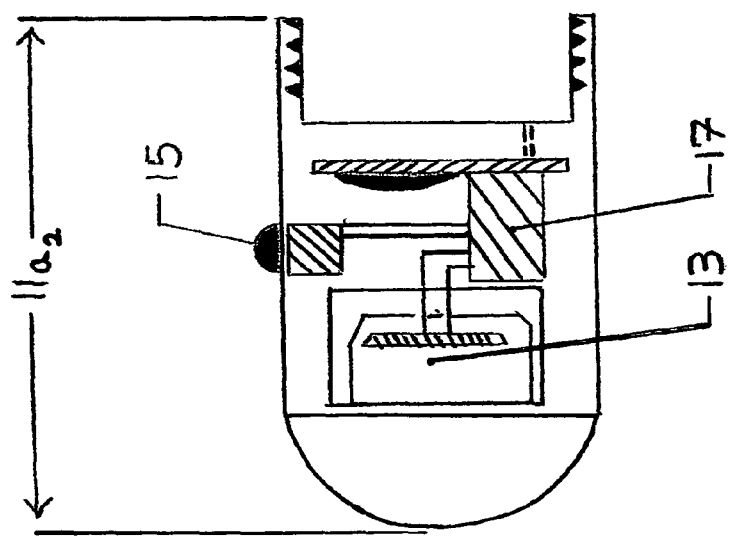
Fig. 2 ered "Autonomous Waterproof Electronic Signaling Device"), and applicant incorporates the entirety of that provisional patent application herein by reference.

AUTONOMOUS WATERPROOF ELECTRONIC SIGNALING DEVICE

CROSS-REFERENCE TO RELATED APPLICATIONS

This application claims the benefit of U.S. Provisional Patent Application No. 60/528,677, filed Dec. 11, 2003 (entitled "Autonomous Waterproof Electronic Signaling Device"), and applicant incorporates the entirety of that provisional patent application herein by reference.

BACKGROUND OF THE INVENTION

This invention relates to underwater signaling devices used by scuba divers, snorkelers, and other water-sports enthusiasts to obtain the attention of others underwater. SCUBA in an acronym referring to divers using a Self-Contained Underwater Breathing Apparatus.

Prior Art Underwater Signaling Devices in General

Underwater signaling devices have been used in scuba diving for years. Some underwater signaling devices use air from the scuba tank which produces an audible low-frequency horn-like sound. Others are designed to bang against the outside of the scuba tank which produces an audible low-frequency clanking-type sound. Still others have been designed to produce a low rattle-type or clicking sound with very limited range. Many of these devices are omni-directional, rather than being directionally oriented.

A Key Need: Directive Electronic Signaling Devices Tailored for Audible Communication To understand this, it must first be understood that sensory limitations, specifically visual and auditory limitations, make the scuba diving experience a somewhat isolating one. For example, because of the visual limitations inherent in scuba diving, divers typically cannot gain the attention of their diving buddy, despite the fact that they are in close proximity to each other.

In addition, auditory limitations, specifically the inability of other divers to hear the human voice, even when a diver is screaming or yelling underwater just a few feet away, force divers to rely almost entirely upon their limited sense of sight, specifically line-of-sight, to attract the attention of their dive buddy, and this is a serious limitation even in good visibility situations. Current devices have limited auditory signal production capability, poor directional focus both in a latitudinal and a longitudinal scope and nominal range.

Furthermore, the limitations of existing devices due to the fact that their function is dependent upon diving equipment (i.e. scuba tank, buoyancy compensation device (BCD) and regulator) makes them useless to all water-sports enthusiasts except scuba divers. This integration requirement introduces the potential for equipment failure and damage, as well as (in the case of pneumatic devices) the accelerated depletion of a diver's air supply, his/her most essential survival necessity.

It is to these underwater communication needs, and other circumstances in which the attention of others is desired, that the instant invention is directed.

BRIEF SUMMARY OF THE INVENTION

The invention disclosed herein provides a truly autonomous electronic signaling device producing a plethora of tones, both modulated and unmodulated, in the audible frequency range of 20 Hz to 20,000 Hz, through use of a specially designed acoustic head.

The Autonomous Waterproof Electronic Signaling Device (AWESD) comprises an (a) momentary on/off switch; (b) a signal emitter, said signal emitter to emit a primary signal upon activation of said activator, said signal emitter comprising one or more of the following: a hydrophone, a siren, a speaker, or a transducer (such as may be found in an HSST multi-purpose assembly); and (c) a head assembly, said head assembly positioned so as to alter at least a portion of said primary signal producing a notification signal. In typical uses, as indicated above, the working signals are audible signals, and the head assembly an acoustic head assembly, so that the invention facilitates the proactive use (and, in many cases, the effective channeling) of sound underwater so as to enable the diver to rapidly and effectively signal those around him.

BRIEF DESCRIPTION OF THE SEVERAL VIEWS OF THE DRAWINGS

FIG. 2 is a left side cutaway view of the invention in FIG. 1 with upper assembly 11a detached from lower assembly 11b.

FIG. 14A is an illustrative figure depicting an end view of the attachment of FIG. 14, taken along the line 14A-14A of FIG. 14.

FIG. 14B is an illustrative figure depicting an side view of the attachment of FIG. 14, taken along the line 14B-14B of FIG. 14.

DETAILED DESCRIPTION OF THE INVENTION

This application claims the benefit of U.S. Provisional Patent Application No. 60/528,677, filed Dec. 11, 2003 (entitled "Autonomous Waterproof Electronic Signaling Device"), and applicant incorporates the entirety of that provisional patent application herein by reference.

Overview of the Invention

General Considerations

In general, communications underwater are restricted because of visual limitations and auditory limitations. Typical visual and auditory ranges are limited to a few yards. Current state of the art has not been able to exceed these limitations.

Important Invention Objectives

A key objective of the Autonomous Waterproof Electronic Signaling Device when activated is to produce a modulated audible tone detectable by the human ear underwater at distances up to fifty feet. This modulated tone will be produced through the use of a hydrophone, a siren, a speaker, or a transducer channeled through an acoustic head mounted on the waterproof body of the device.

A second key objective of the invention is to enhance the control the user exerts over the sound field. The acoustic head's unique physical attributes and specifications allow it to produce excellent control of the sound field in both the latitudinal direction (i.e., the directions normal/tangential to the longitudinal direction such as in the direction of the y- and z-orthogonal axes) and the longitudinal direction (i.e., the direction of the x-axis, which parallels the acoustic axis) with reference to the acoustic axis.

With reference to FIGS. 8 through 13, the various acoustic heads and their respective divergences from the acoustic axis are illustrated qualitatively for comparison purposes. This divergence from the acoustic axis is believed to be a function of velocity, radius of the transducer, and the frequency of the sound produced.

Figure 8:
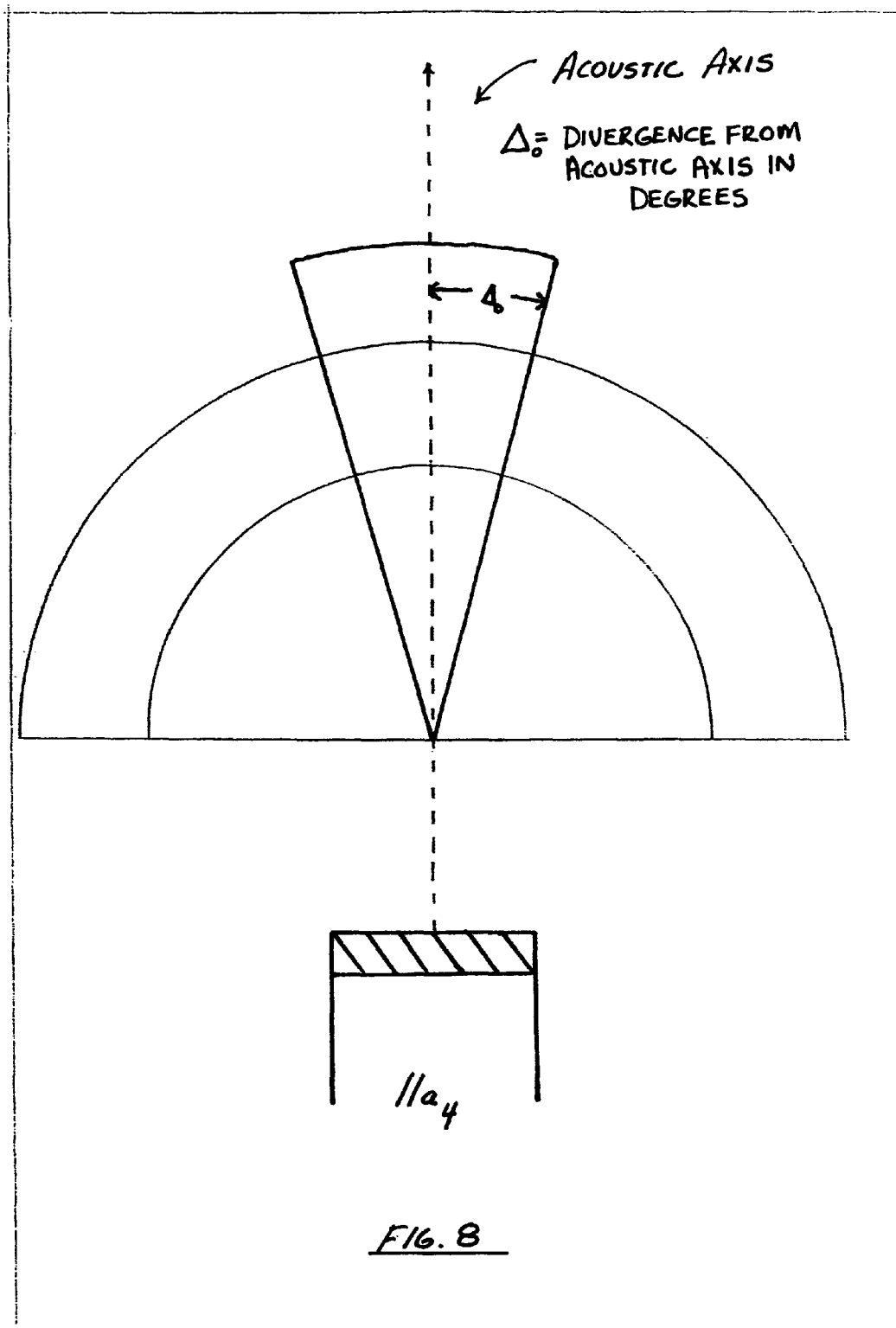
FIG. 8 is an illustrative figure depicting the characteristics of the sound field that would result from use of an acoustic head assembly such as that shown in FIG. 4.
Figure 9:
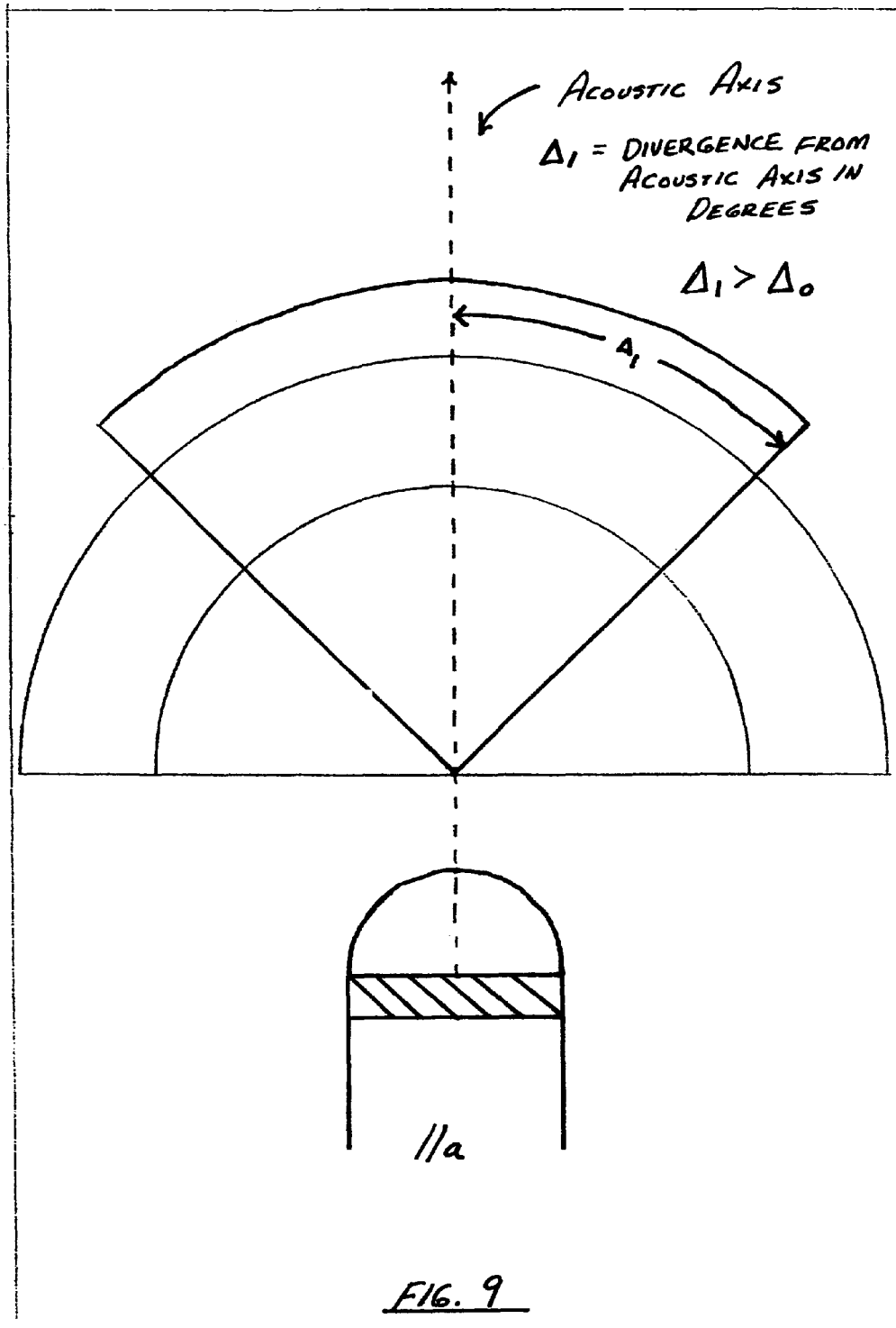
FIG. 9 is an illustrative figure depicting the characteristics of the sound field that would result from use of an acoustic head assembly such as that shown in FIG. 1, FIG. 2, or FIG. 6.
Figure 10:
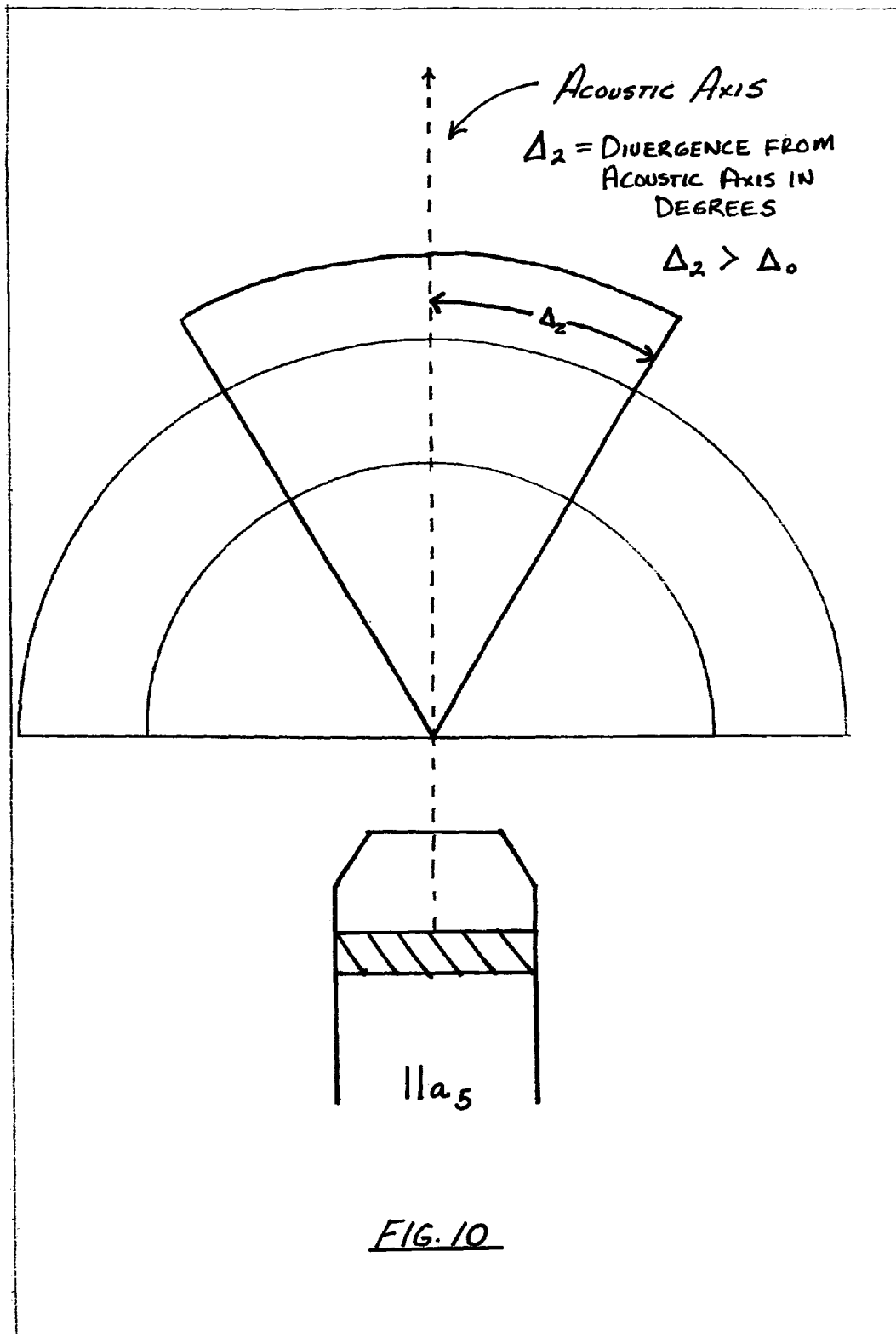
FIG. 10 is an illustrative figure depicting the characteristics of the sound field that would result from use of an acoustic head assembly such as that shown in FIG. 5.
Figure 11:
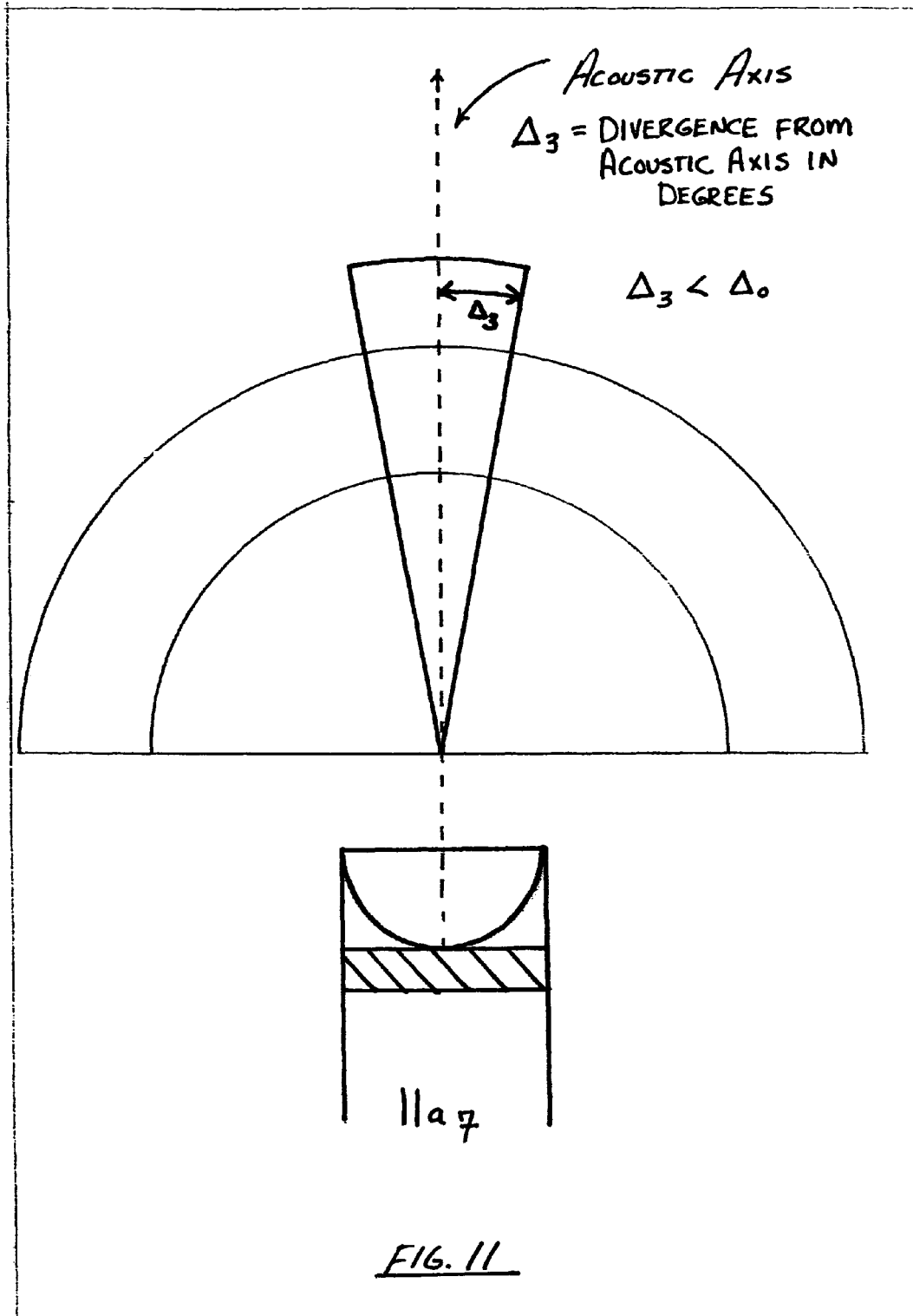
FIG. 11 is an illustrative figure depicting the characteristics of the sound field that would result from use of an acoustic head assembly such as that shown in FIG. 7.
Figure 12:
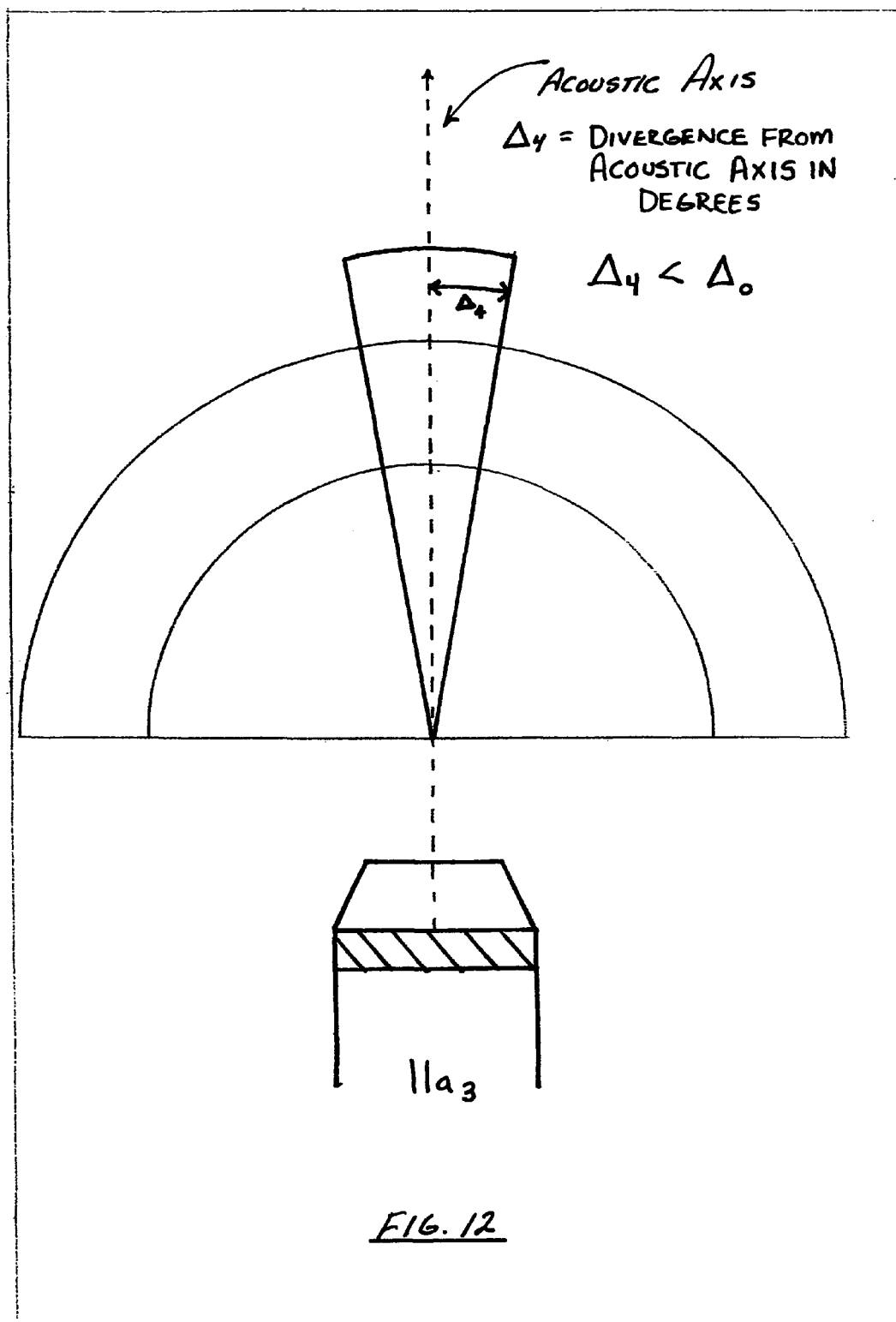
FIG. 12 is an illustrative figure depicting the characteristics of the sound field that would result from use of an acoustic head assembly such as that shown in FIG. 3.

FIG. 8 represents the divergence for the sound field produced by a round transducer located at the end of a right circular cylinder, which defines a reference value, $\Delta_0$. FIGS. 9 and 10 depict acoustic heads $11a$ and $11a_5$ respectively, both of which have a divergence greater than $\Delta_0$. FIGS. 11 and 12 depict acoustic heads $11a_7$ and $11a_3$, respectively, both of which have a divergence less than $\Delta_0$.

A third key objective of the invention is to protect and extend the effective range of the audible signal. The increased control of the audible signal imparted by the invention increases the effective range of the signal, making it effective for attracting attention at greater distances.

A fourth key objective of the invention is to increase its utility in attracting the attention of other divers underwater. The modulated nature of the signal makes it easily distinguishable from the background noise found underwater. It differs from this background noise in two ways: (a) it operates over a frequency range, oscillating between the high and low extremes of the range which helps to distinguish it from the predominately monotone nature of the background noise: and (b) it operates at a higher frequency than the background noise underwater which also helps it to stand out. Low frequencies travel better than high frequencies underwater, and therefore the background noise will be dominated by lower frequencies, making the higher frequency of the A.W.E.S.D. easier to differentiate and recognize. This modulated tone will be very recognizable and will gain the attention of others in close proximity (fifty feet).

A fifth key objective of the invention is to further enhance the functionality of the A.W.E.S.D. by means of an "adjustable divergence attachment" 25 which can be slipped over any of the acoustic heads to facilitate the additional and adjustable focusing of the audible sound along the acoustic centerline.

A sixth key objective of the Autonomous Waterproof Electronic Signaling Device (A.W.E.S.D.) is its ability to function independently. The A.W.E.S.D., unlike the majority of signaling devices used underwater, is capable of functioning autonomously to produce its audible acoustic signal. Its performance is not contingent upon the performance of, or a drain upon the resources of, any other diver system or sub-system.

Devices such as pneumatic signaling units are installed in-line with (and are therefore dependent on) a scuba diver's air supply and in conjunction with the inflation device for their BCD. The drawbacks to this arrangement are twofold. First, every time an individual wishes to signal with the pneumatic device, he or she is consuming their most valuable underwater resource: their breathable air supply. Secondly, the addition of another component into the air supply system increases the complexity of the system and therefore the number of places where malfunctions or leaks can occur.

Devices including tank bangers and the ad hoc use of dive knives to bang against the scuba diver's air tank obviously rely on the air tank to produce their sound and therefore will not function without the tank. In addition to their inability to function independently, the repeated force associated with the impact necessary to produce the noise can potentially damage both a tank and it's exterior coating.

A seventh key objective of the Autonomous Waterproof Electronic Signaling Device (A.W.E.S.D.) is its ability to facilitate a signal recipient's attempts to locate the origin of the notification signal. As indicated, the A.W.E.S.D. is particularly effective in effectuating communication between divers underwater by means of an auditory signal. Furthermore, when another diver hears the invention's notification signal, and he scans his visual horizon in an effort to locate the origin of the signal, he is aided in his efforts by a visual cue emanating from the invention. This facilitates the rapid establishment of a rapport between two or more divers and enables them to more effectively manage another important underwater asset: time.

DETAILED DESCRIPTION

Figure 1:
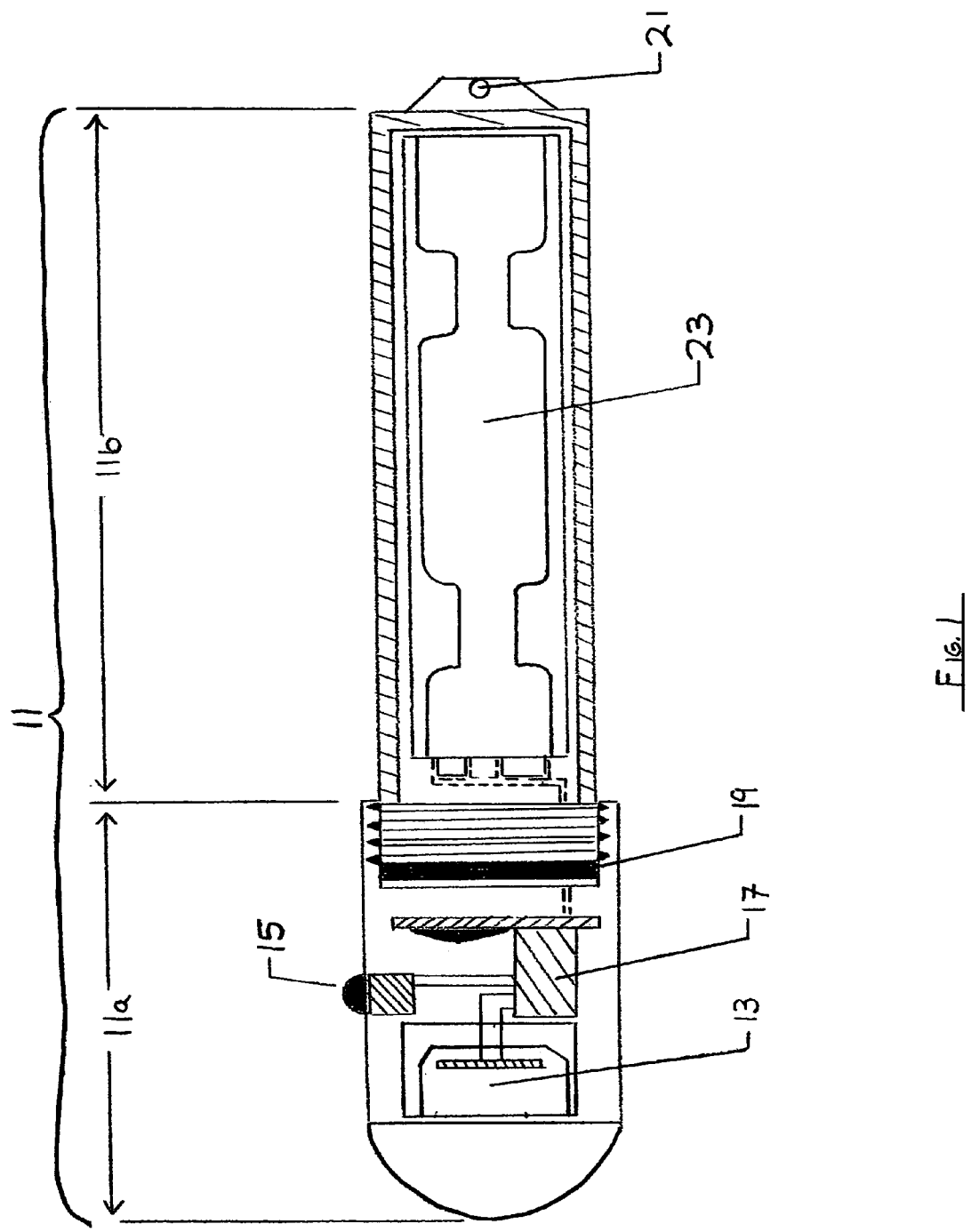
FIG. 1 is a left side cutaway view of the present invention.

With reference now to the drawings, and in particular with reference to FIG. 1, a preferred embodiment of the A.W.E.S.D. (Autonomous Waterproof Electronic Signaling Device) 11 of the present invention is illustrated. Reference to this figure, as well as FIG. 2 (which depicts the invention's separate assemblies), reveals that the invention comprises an upper assembly $11a$ and a lower assembly $11b$. Upper assembly $11a$ in FIG. 1 is identical to upper assembly $11a_2$ in FIG. 2.

As is evident in FIG. 1, typically, A.W.E.S.D. 11 has a water tight body length of approximately 6 to 7 inches and approximately 1 to 2 inches in width and approximately 1 to 2 inches in depth. Device 11 is preferably manufactured of high grade plastic resin or compound or other appropriate material.

Upper assembly $11a$ is composed of clear translucent material such as polycarbonate, acrylic, or other translucent material, or any suitable material including but not limited to plastic resins or compounds. This upper assembly $11a$ is sealed and/or molded to the lower assembly $11b$ to create a watertight body 11. Upper assembly $11a$ is hollow inside to allow the mounting of HSST assembly 13, which comprises one or more of the following: a hydrophone, siren, speaker, and/or transducer.

HSST assembly 13 is connected to HSST electronics package 17 which comprises all necessary electrical components needed for the proper functioning of the HSST assembly, including but not limited to a timing circuit, wires, leads and connectors, grounding capability, electrical components such as resistors, capacitors, diodes, transistors, piezoelectric crystals, coils, amplifiers, and computer chips. These components are arranged in a circuit to produce the oscillating sound in the preferred frequency range.

The human ear is capable of detecting sounds in the frequency range of approximately 20 Hz to 20,000 Hz. This range of human hearing capability is applicable in air or under water. Although a transducer emitting a monotone sound can be effective, generally speaking, a transducer that produces a sound which is comprised of an oscillating signal, be it oscillating between two, three, or four or more, different tones is generally more effective as a communication/signaling mechanism. Simply put, variation of the frequency of sound increases the effectiveness of the device at attracting the attention of another person, and is particularly effective under water.

Sound signals in the range of 1500 Hz to 6000 Hz are more easily discernable underwater than those in a broader range, and a signal, particularly an oscillating signal, in the narrower range of 2000 Hz to 4500 Hz has very desirable characteristics, and is extremely effective when used to gain the attention of another human being underwater.

Figure 13:
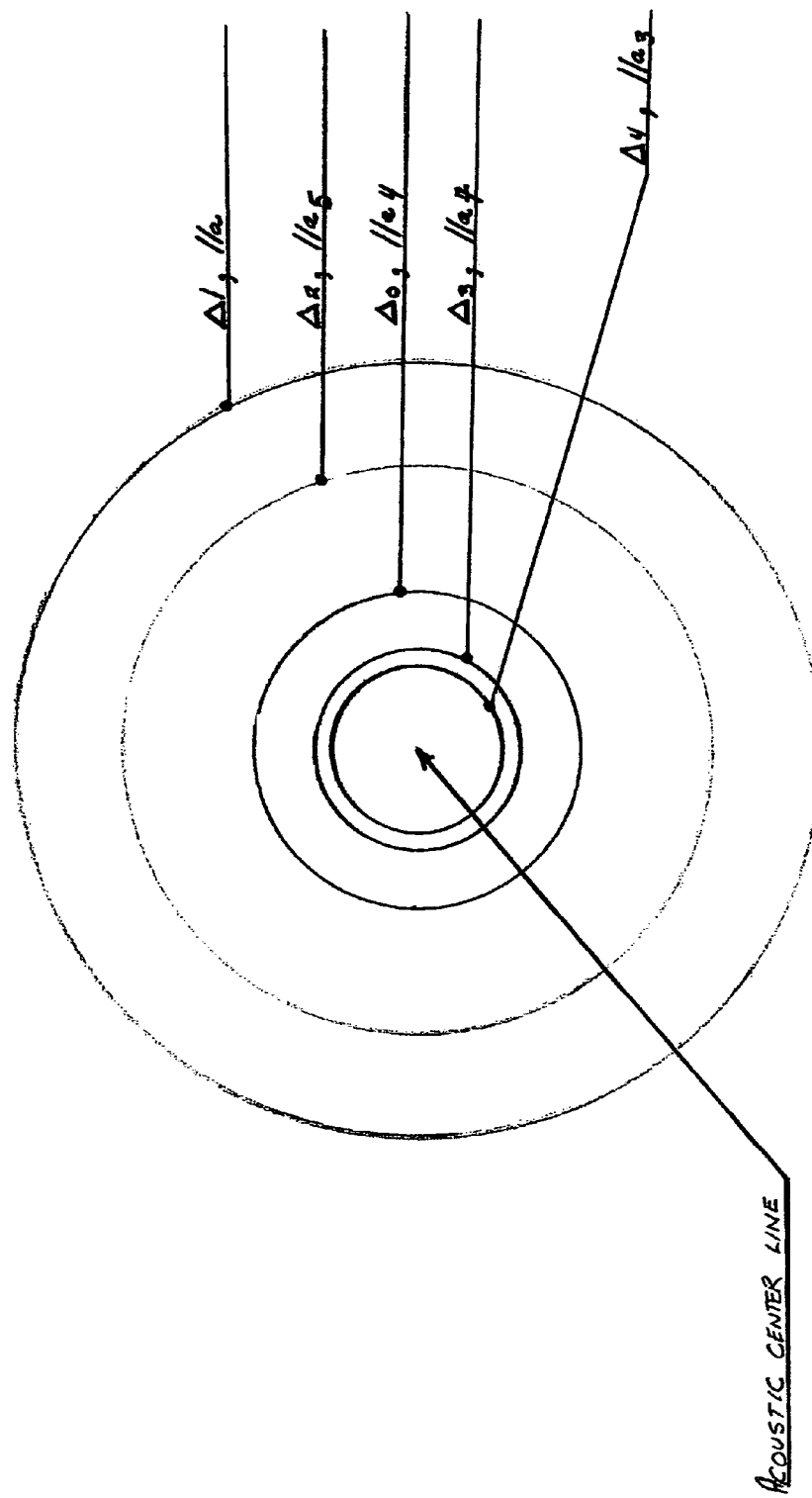
FIG. 13 is an illustrative figure depicting comparative characteristics of the sound fields referenced in FIGS. 8-12.

FIG. 9 provides illustrative guidance regarding the nature of the sound field that results from the use of the type of acoustic head shown in FIG. 1 and FIG. 2; FIG. 13 provides additional guidance regarding how this sound field differs from that generated by the other embodiments shown herein.

HSST electronics package 17 terminates in a pair of contacts to transfer power from the battery(ies) to the HSST electronics package.

Operation of the HSST assembly 13 and HSST electronics package 17 is controlled by activator 15. Activator 15 is a waterproof momentary switch sealed and/or molded to watertight body 11. The activator 15, HSST assembly 13, and HSST electronics package 17 may be configured to effectuate any desired on-off functionality (e.g., signal emitted only while actuator depressed; signal emitted constantly after actuation until actuator depressed again; signal emitted for a pre-determined period of time upon actuation). Upper assembly 11a is threaded at the open end with the threads on the inner surface of the assembly.

A water tight seal is made when joined with the lower assembly 11b, which has matching threads on the exterior. The watertight sealing of upper assembly 11a and lower assembly 11b is enhanced by the integration of gasket 19. Gasket 19 is comprised of rubber or any other flexible material suitable for ensuring a watertight seal.

Lower assembly 11b is preferably manufactured of high grade plastic resin or compound or other appropriate material. Lower assembly 11b features external threads on its open end and terminates in lanyard connection point 21 molded into the outside of the closed end. Lower assembly 11b is hollow inside to allow it to accommodate battery holder assembly 23. Battery holder assembly 23 is made of plastic resin or compound or other suitable material and comprises all necessary leads, connectors and contacts including but not limited to spring type contacts.

Figure 3:
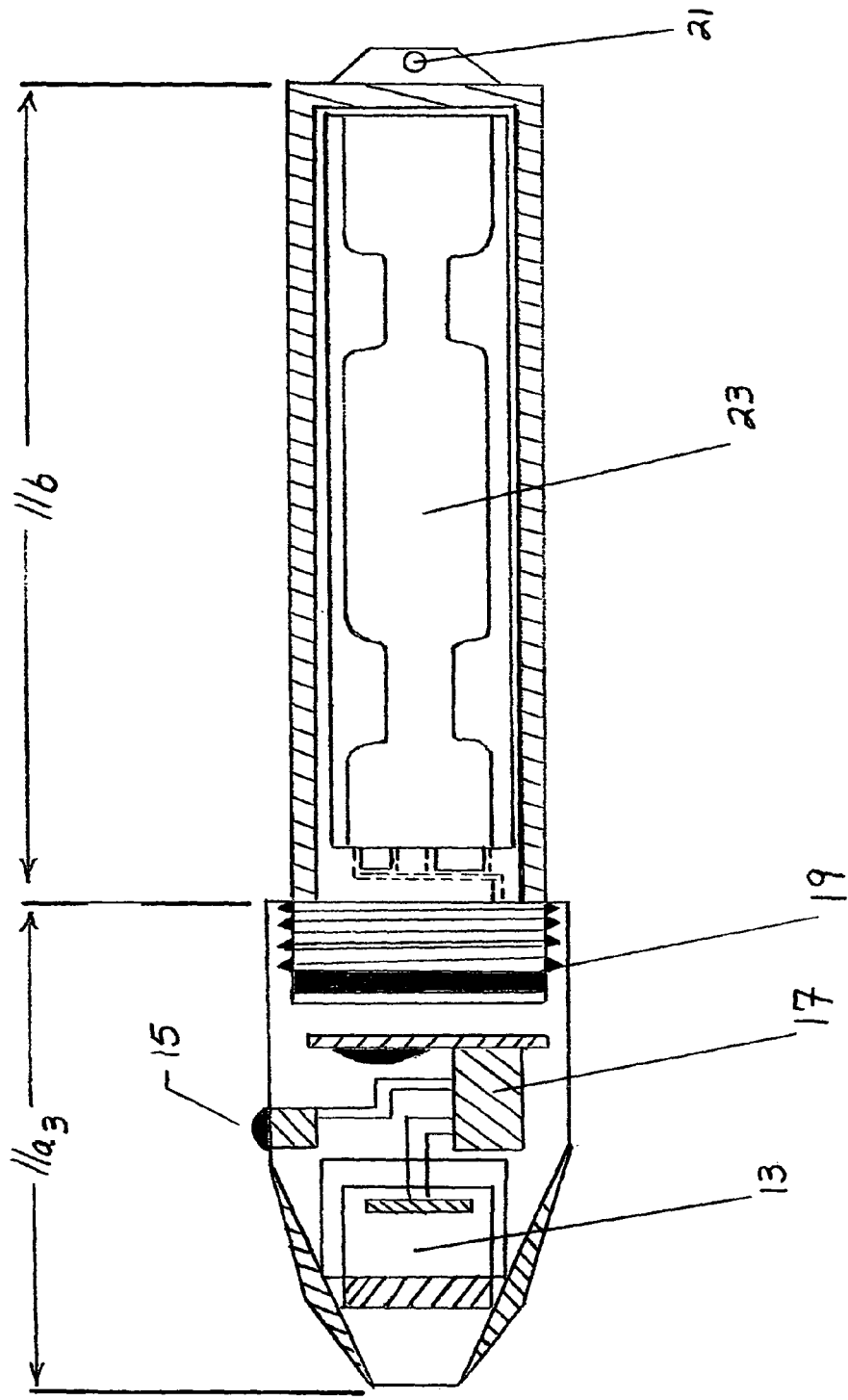
FIG. 3 is a left side cutaway view of the invention in FIG. 1 with an alternate upper assembly $11a_3$.

With reference to FIG. 3, the A.W.E.S.D. is the same as it appears in FIG. 1 with one exception. Upper assembly 11a has been shown in an alternate embodiment as upper assembly $11a_3$. Upper assembly $11a_3$ comprises a closed end whose curvature differs significantly from that of upper assembly 11a. This different curved surface is designed to give upper assembly $11a_3$ different acoustic properties from those of upper assembly 11a. FIG. 12 provides illustrative guidance regarding the nature of the sound field that results from the use of this type of acoustic head; FIG. 13 provides additional guidance regarding how this sound field differs from that generated by the other embodiments shown herein.

Figure 4:
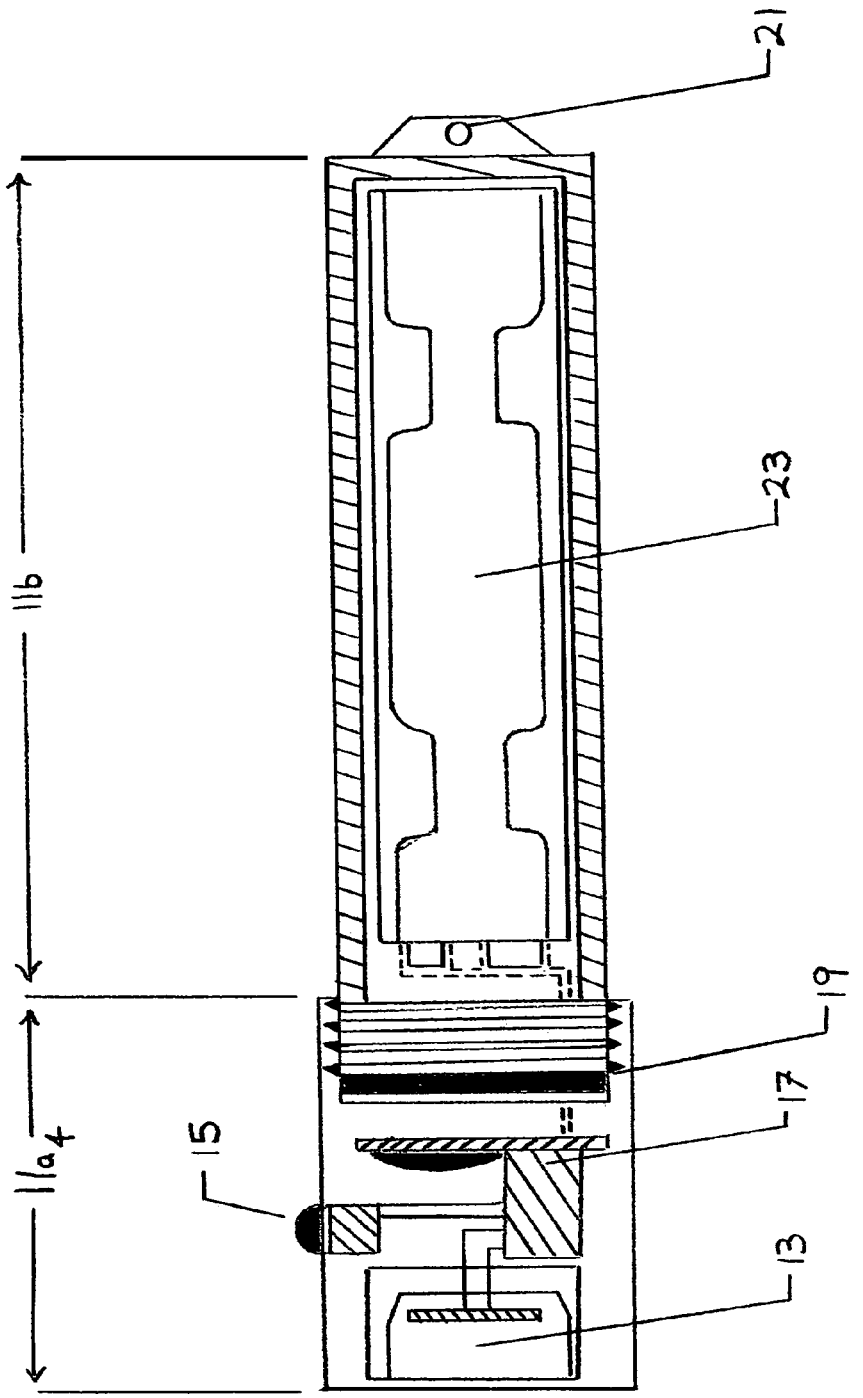
FIG. 4 is a left side cutaway view of the invention in FIG. 1 with an alternate upper assembly $11a_4$.

With reference to FIG. 4, the A.W.E.S.D. is the same as it appears in FIG. 1 with one exception. Upper assembly 11a has been shown in an alternate embodiment as upper assembly $11a_4$. Upper assembly $11a_4$ comprises a closed end without curvature which differs significantly from that of upper assembly 11a. This different surface is designed to give upper assembly $11a_4$ different acoustic properties from those of upper assembly 11a. FIG. 8 provides illustrative guidance regarding the nature of the sound field that results from the use of this type of acoustic head; FIG. 13 provides additional guidance regarding how this sound field differs from that generated by the other embodiments shown herein.

Figure 5:
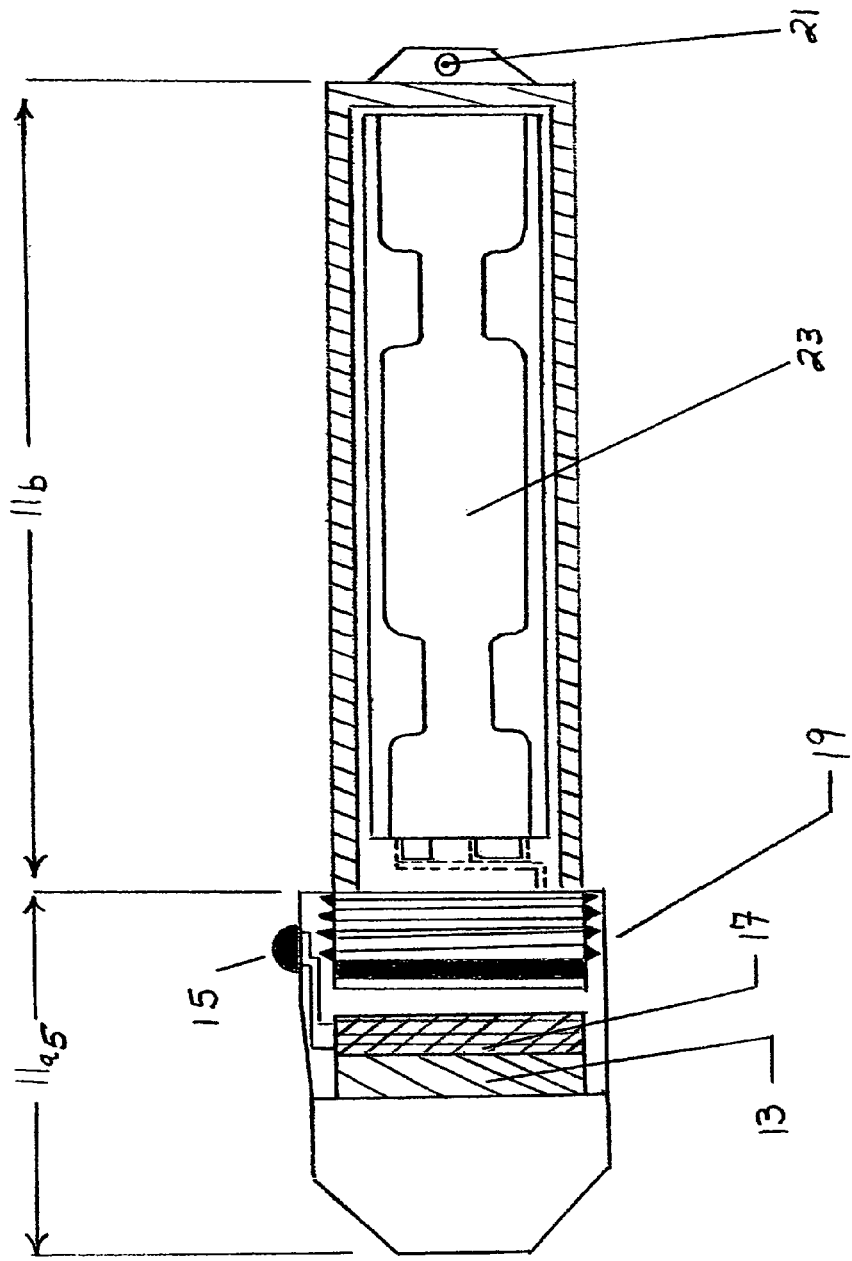
FIG. 5 is a left side cutaway view of the invention in FIG. 1 with an alternate upper assembly $11a_5$.

With reference to FIG. 5, the A.W.E.S.D. is the same as it appears in FIG. 1 with one exception. Upper assembly 11a has been shown in an alternate embodiment as upper assembly $11a_5$. Upper assembly $11a_5$ comprises a frustum of a right circular cone whose physical attributes differ significantly from that of upper assembly 11a. These different attributes are designed to give upper assembly $11a_5$ different acoustic properties from those of upper assembly 11a. FIG. 10 provides illustrative guidance regarding the nature of the sound field that results from the use of this type of acoustic head; FIG. 13 provides additional guidance regarding how this sound field differs from that generated by the other embodiments shown herein.

Figure 6:
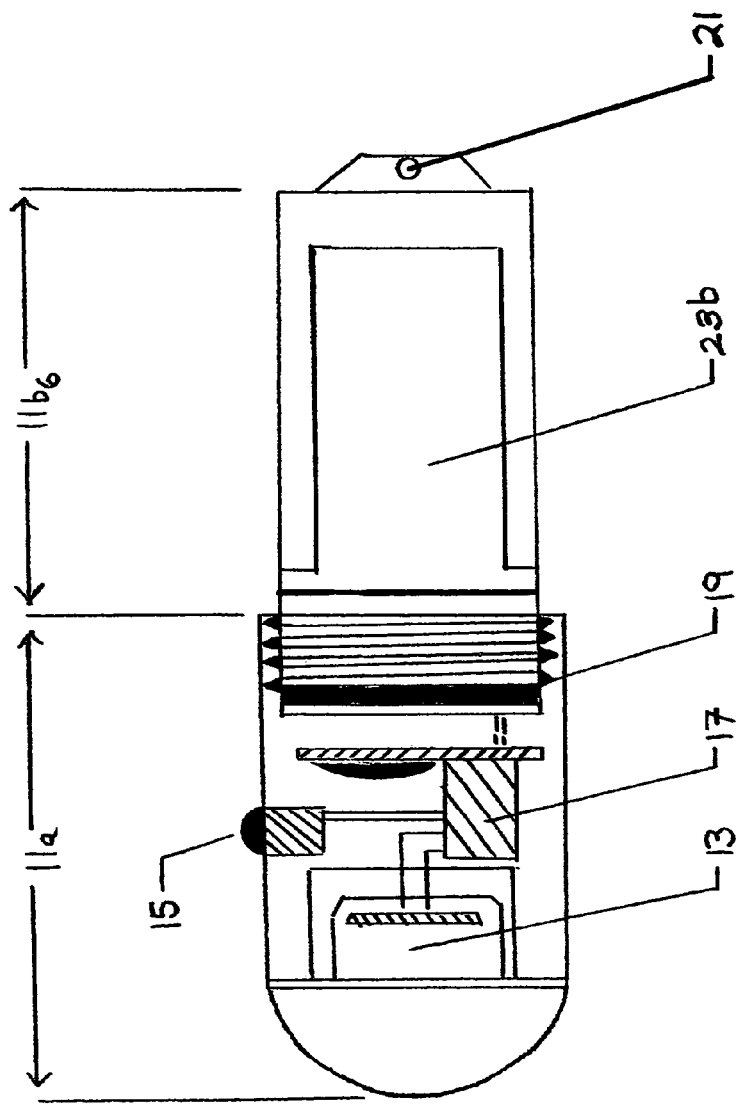
FIG. 6 is a left side cutaway view of the invention in FIG. 1 with an alternate lower assembly $11b_6$.

With reference to FIG. 6, the A.W.E.S.D. is the same as it appears in FIG. 1 with one exception. Lower assembly 11b has been shown in an alternate embodiment as lower assembly $11b_6$. Lower assembly $11b_6$ comprises a watertight body similar to lower assembly 11b, but being of a shorter length designed to allow the device to be powered by fewer and/or smaller batteries, contained in a smaller battery holder assembly 23b, thus making the A.W.E.S.D. a more compact unit. Since the acoustic head of upper assembly $11a_6$ is identical to the acoustic head of identical upper assembly 11a, then its sound field is identical to that generated by the invention as shown in FIG. 1 and FIG. 2. FIG. 9 provides illustrative guidance regarding the nature of the sound field that results from the use of this type of acoustic head; FIG. 13 provides additional guidance regarding how this sound field differs from that generated by the other embodiments shown herein.

Figure 7:
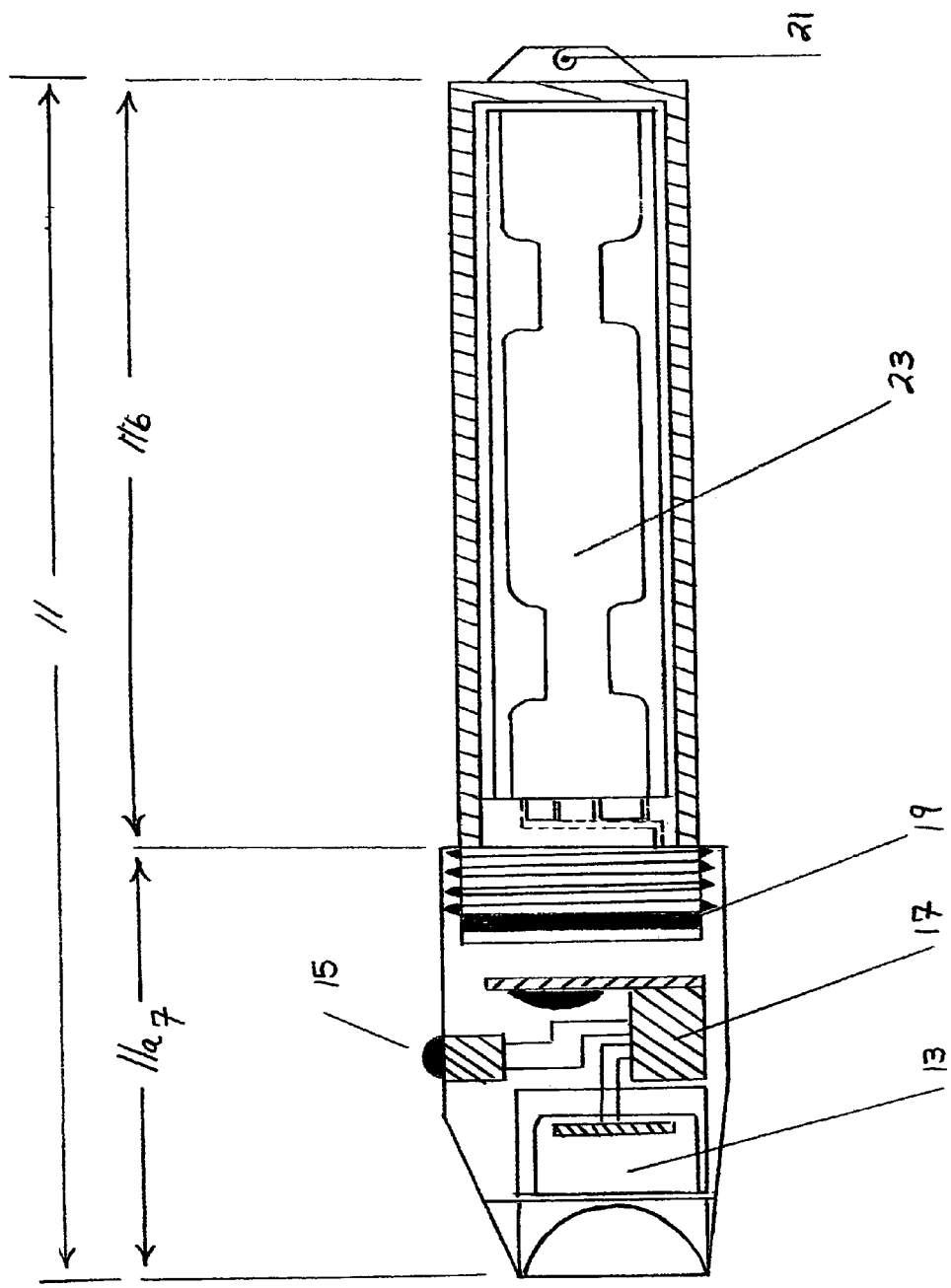
FIG. 7 is a left side cutaway view of the invention in FIG. 1 with an alternate upper assembly $11a_7$.

With reference to FIG. 7, the A.W.E.S.D. is the same as it appears in FIG. 1 with one exception. Upper assembly 11a has been shown in an alternate embodiment as upper assembly $11a_7$. Upper assembly $11a_7$ comprises a frustum of a right circular cone whose physical attributes differ significantly from that of upper assembly 11a. These different attributes are designed to give upper assembly $11a_7$ different acoustic properties from those of upper assembly 11a. FIG. 11 provides illustrative guidance regarding the nature of the sound field that results from the use of this type of acoustic head; FIG. 13 provides additional guidance regarding how this sound field differs from that generated by the other embodiments shown herein.

Figure 14:
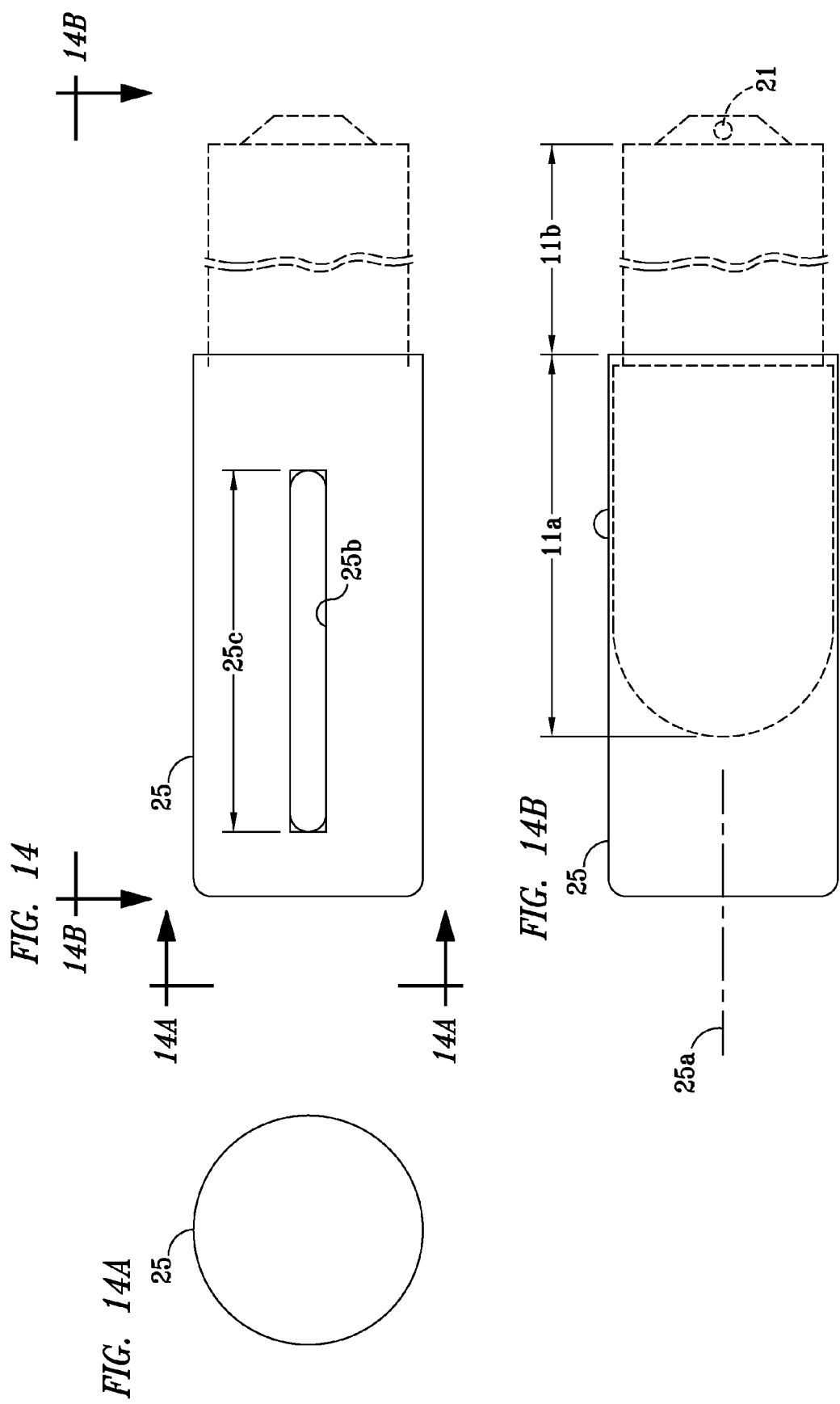
FIG. 14 is an illustrative figure depicting a top view of a design for an adjustable divergence attachment useful in conjunction with the invention embodiments described herein.

With reference to FIG. 14, 14A, and 14B, an adjustable divergence attachment 25 is shown. The adjustable divergence attachment 25 is an essentially cylindrical member which fits closely and slidably about upper assembly 11a (and its corresponding counterparts, 11a3, 11a4, etc., in the other embodiments shown herein) so as to facilitate the adjustable manipulation of the sound field by the user. In brief, either before, during or after actuation of the invention, the adjustable divergence attachment 25 may be slidably re-positioned along the acoustic axis 25a of the invention, resulting in a modified divergence and sound field. This expands the signaling options available to the user of the invention. With reference to FIG. 14A, the surface of attachment 25 is preferably provided with a friction surface all around. With reference to FIG. 14B, the attachment 25 is preferably provided with a slide cut-out 25b having a slide length 25c.

Figure 15:
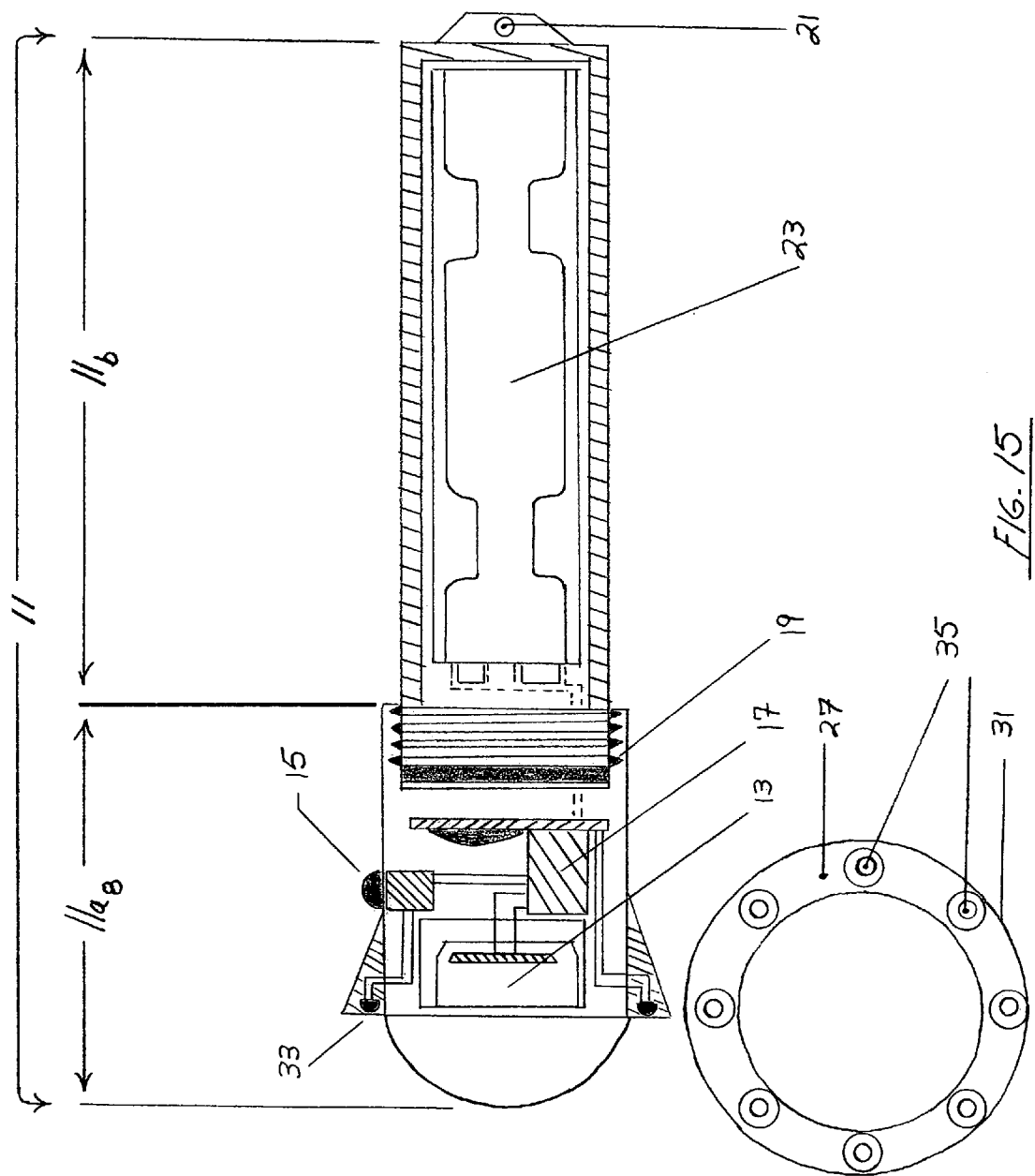
FIG. 15 is a left side cutaway view of the invention in FIG. 1 with an alternate upper assembly $11a_8$ which facilitates the delivery of a visual signal.

With reference to FIG. 15, the A.W.E.S.D. is the same as it appears in FIG. 1 with one main exception. Upper assembly 11a has been shown in an alternate embodiment as upper assembly $11a_8$. Upper assembly $11a_8$ comprises one or more visual signal emitters, which function to deliver a visual signal to facilitate efforts by signal recipients to locate the source of the A.W.E.S.D.'s main notification signal. The precise mechanisms by which the visual signal emitting functionality is implemented can be adjusted to the needs of different types of divers. Certainly, the invention circuitry can be configured so that, whenever the main notification signal is being generated, a supplementary visual signal is simultaneously emitted (perhaps in a monotone pattern or, alternatively, in a pattern which is similar to, or which contrasts with, the main notification signal). Alternatively, the invention circuitry could be configured so as to deliver intermittent visual cues, so as to conserve battery life. Finally, additional actuators, and accompanying circuitry, could be added to the invention so as to be able to actuate the main signal emitters and the visual signal emitter(s) completely independently.

In FIG. 15, the visual signal emitter is a concentric, or annular, illuminator which encircles the HSST assembly 13 and acoustic head. When the main notification signal is generated, a supplementary visual signal is simultaneously emitted. Although this is believed to be a particularly effective mechanism for visual notification, other equivalent embodiments are possible.

Illustrative Implementation

The following listing provides information relating to an illustrative implementation of the invention. The information provided does not represent the only mode of implementation; rather, it represents one embodiment of many of the invention elements, for which there may well be numerous equivalents.

11. Preferred Embodiment/Device body
    Plastic resin or compound or other appropriate material
    Hollow so as to contain all components
    Waterproof
    Impact resistant
    Slightly negative buoyant when completely assembled
11a. Upper Assembly (also $11a_2$, $11a_6$)
    Clear translucent material (polycarbonate, acrylic, etc.) or any plastic resin or compound or any other suitable material
    Closed at one end
    Threaded on interior at other end
    Unique physical attributes which enhance acoustic characteristics of device
$11a_3$. Upper Assembly—Alternate embodiment
    Clear translucent material (polycarbonate, acrylic, etc.) or any plastic resin or compound or any other suitable material
    Closed at one end
    Threaded on interior at other end
    Unique physical attributes which enhance acoustic characteristics of device
$11a_4$. Upper Assembly—Alternate embodiment
    Clear translucent material (polycarbonate, acrylic, etc.) or any plastic resin or compound or any other suitable material
    Closed at one end
    Threaded on interior at other end
    Unique physical attributes which enhance acoustic characteristics of device
$11a_5$. Upper Assembly—Alternate embodiment
    Clear translucent material (polycarbonate, acrylic, etc.) or any plastic resin or compound or any other suitable material
    Closed at one end
    Threaded on interior at other end
    Unique physical attributes which enhance acoustic characteristics of device
$11a_7$. Upper Assembly—Alternate embodiment
    Clear translucent material (polycarbonate, acrylic, etc.) or any plastic resin or compound or any other suitable material
    Closed at one end
    Threaded on interior at other end
    Unique physical attributes which enhance acoustic characteristics of device
$11a_8$. Upper Assembly—Alternate embodiment
    Clear translucent material (polycarbonate, acrylic etc.) or any plastic resin or compound or other appropriate material
    Closed at one end
    Threaded on interior at other end
    Unique physical attributes which enhance acoustic characteristics of device
    Unique physical features for added light or light bulbs to enhance notification or visual needs
11b. Lower Assembly
    Plastic resin or compound or other appropriate material
    Closed at one end
    Threaded on exterior to allow connection with 11a
    Unique physical attributes which enhance acoustic characteristics of device
$11b_6$. Lower Assembly—Alternate embodiment
    Plastic resin or compound or other appropriate material
    Closed at one end
    Threaded on exterior to allow connection with 11a
    Unique physical attributes which enhance acoustic characteristics of device
    Shorter in length to accommodate fewer and/or smaller batteries
13. Hydrophone, siren, speaker, or transducer (HSST)
    Able to send and/or receive audible and/or inaudible frequencies
    Covering the frequency range from 0.1 Hz. To 2 MHz.
    Preferred frequency range of 1500 Hz. to 6000 Hz.
    Operable over a wide temperature range, from 0° C. to 100° C.
    Transducers including but not limited to piezoelectric design
15. Activator
    Momentary switch
    Waterproof
17. HSST electronics package
    Timing circuit
    Wires, leads, connectors
    Grounding capability
    Electrical components including—resistors, coils, amplifiers, diodes, capacitors transistors, piezoelectric crystals and other essential components Connector for batteries
19. Gasket
  Rubber or other suitable material
  Aids in maintaining waterproof seal between 11a and 11b
21. Lanyard connection point
  Molded on the outside of 11a
23. Battery holder assembly
  Plastic resin or compound or other suitable material
  Leads, connectors, contacts
23b. Battery holder assembly
  Plastic resin or compound or other suitable material
  Leads, connectors, contacts
  Shorter in length to accommodate fewer and/or smaller batteries
25. Adjustable divergence attachment
  Plastic resin or compound or other suitable material
27. Reflector for light bulbs
  Plastic, metal, or other appropriate material or combination of materials
  Appropriate shape to enhance the pattern of the light waves emitted
29. Wire chase
  Wires and connectors
31. Mounting ring screw down
  Threaded to mount on exterior of 11a8
33. Lens
  Translucent material (polycarbonate, acrylic etc.) or other appropriate material
35. Light bulb
  LED, xenon bulb or any other suitable light source type
37. Activator switch for flashlight
  Two or three position switch
  On/off, momentary or a combination of the two
  Waterproof In the above illustrative material, the following acronyms have the following meanings: (a) AWESD—Autonomous Waterproof Electronic Signaling Device; (b) HSST—Hydrophone, Siren, Speaker, Transducer Assembly; (c) BCD—Buoyancy Control Device; (d) SCUBA—Self-Contained Underwater Breathing Apparatus.

Refinements of Interest

Additional experimentation has revealed that, although the use of a momentary on/off switch is desirable in a majority of the situations in which a switch is employed in the instant invention, desirable functionality is also achieved, wherever a momentary switch or other switch may be employed, through the use of a reed switch, a pneumatic switch, an external on/off switch, and/or a waterproof switch.

In addition, although it was originally believed that the sound waves generated by, the invention were detectable by the human ear at distances up to fifty feet, it has been discovered that sound waves generated by the invention and its various components and subassemblies are detectable by the human ear at distances up to fifty feet and beyond.

Furthermore, although it was recommended that various components be constructed of clear translucent materials, the reader of ordinary skill in the art will doubtless appreciate that opaque materials may readily be employed whenever translucence is not required by the application; conversely, whenever the invention features the use of a visual signal, and translucence of various component materials of construction is desired, then, of course, translucent materials should be employed. For example, if no visual signal is generated by a particular embodiment, then an opaque body may be employed; however, if a visual signal is incorporated into the embodiment, then, of course, a translucent body (or at least partially translucent body) is desired.

Although the invention has been described with reference to a preferred embodiment, this description is not to be construed in a limiting sense. Various permutations and modifications of the disclosed embodiment, including its enumerated features, as well as alternative embodiments of the invention, will become apparent to persons skilled in the art upon reference to this specification.

We claim:

1. A signaling device comprising:
  (a) an activator;
  (b) a signal emitter, said signal emitter to emit a primary aquatic signal upon activation of said activator, said signal emitter comprising one or more of the following: a hydrophone, a siren, a speaker, or a transducer;
  (c) a head assembly, said head assembly positioned so as to alter at least a portion of said primary aquatic signal producing a notification signal;
  (d) wherein said primary aquatic signal comprises sound waves;
  (e) wherein said head assembly comprises an acoustic head assembly, said acoustic head assembly altering a substantial portion of said sound waves of said primary aquatic signal; and
  (f) wherein said sound waves feature a frequency in the range of about 1500 Hz to about 6000 Hz.

2. The signaling device of claim 1 wherein said sound waves feature a frequency in the range of about 2000 Hz to about 4500 Hz.

3. A signaling device comprising:
  (a) an activator;
  (b) a signal emitter, said signal emitter to emit a primary aquatic signal upon activation of said activator, said signal emitter comprising one or more of the following: a hydrophone, a siren, a speaker, or a transducer;
  (c) a head assembly, said head assembly positioned so as to alter at least a portion of said primary aquatic signal producing a notification signal;
  (d) wherein said primary aquatic signal comprises sound waves;
  (e) wherein said head assembly comprises an acoustic head assembly, said acoustic head assembly altering a substantial portion of said sound waves of said primary aquatic signal;
  (f) wherein said sound waves feature a frequency in the range of about 2000 Hz to about 4500 Hz; and
  (g) wherein said sound waves oscillate among two or more set frequencies in a non-random pattern.

4. A signaling device comprising:
  (a) an activator;
  (b) a signal emitter, said signal emitter to emit a primary aquatic signal comprising sound waves upon activation of said activator, said signal emitter comprising one or more of the following: a hydrophone, a siren, a speaker, or a transducer;
  (c) an acoustic head assembly, said acoustic head assembly positioned so as to alter at least a portion of said primary aquatic signal producing a notification signal;
  (d) wherein said acoustic head assembly alters a substantial portion of said sound waves of said primary aquatic signal; and
  (e) an adjustable divergence attachment, said adjustable divergence attachment positioned so as to alter at least a portion of said notification signal so as to produce a user-defined notification signal.

5. A signaling device comprising:
(a) an activator;
(b) a signal emitter, said signal emitter to emit a primary aquatic signal comprising sound waves upon activation of said activator, said signal emitter comprising one or more of the following: a hydrophone, a siren, a speaker, or a transducer;
(c) an acoustic head assembly, said acoustic head assembly positioned so as to alter at least a portion of said primary aquatic signal producing a notification signal;
(d) wherein said acoustic head assembly alters a substantial portion of said sound waves of said primary aquatic signal; and
(e) wherein said acoustic head assembly alters said substantial portion of said sound waves by means of an right circular cylindrical profile about which said substantial portion of said sound waves pass.

6. A signaling device comprising:
(a) an activator;
(b) a signal emitter, said signal emitter to emit a primary aquatic signal comprising sound waves upon activation of said activator, said signal emitter comprising one or more of the following: a hydrophone, a siren, a speaker, or a transducer;
(c) an acoustic head assembly, said acoustic head assembly positioned so as to alter at least a portion of said primary aquatic signal, producing a notification signal;
(d) wherein said acoustic head assembly alters a substantial portion of said sound waves of said primary aquatic signal; and
(e) wherein said acoustic head assembly alters said substantial portion of said sound waves by means of an concave-inwards hemi-spherical profile about which said substantial portion of said sound waves pass.

7. A signaling device comprising:
(a) an activator;
(b) a signal emitter, said signal emitter to emit a primary aquatic signal comprising sound waves upon activation of said activator, said signal emitter comprising one or more of the following: a hydrophone, a siren, a speaker, or a transducer;
(c) an acoustic head assembly, said acoustic head assembly positioned so as to alter at least a portion of said primary aquatic signal, producing a notification signal;
(d) wherein said acoustic head assembly alters a substantial portion of said sound waves of said primary aquatic signal; and
(e) wherein said acoustic head assembly alters said substantial portion of said sound waves by means of an concave-outwards hemi-spherical profile about which said substantial portion of said sound waves pass.

8. A signaling device comprising:
(a) an activator;
(b) a signal emitter, said signal emitter to emit a primary aquatic signal comprising sound waves upon activation of said activator, said signal emitter comprising one or more of the following: a hydrophone, a siren, a speaker, or a transducer;
(c) an acoustic head assembly, said acoustic head assembly positioned so as to alter at least a portion of said primary aquatic signal, producing a notification signal;
(d) wherein said acoustic head assembly alters a substantial portion of said sound waves of said primary aquatic signal; and
(e) wherein said acoustic head assembly alters said substantial portion of said sound waves by means of an obtuse frusta-conical profile about which said substantial portion of said sound waves pass.

9. The signaling device of claim 3 further comprising a visual signal emitter, said visual signal emitter to emit a visual signal upon activation of said activator.

10. The signaling device of claim 9 wherein said visual signal features a non-random oscillating pattern similar to said non-random pattern employed for said sound waves.

11. A signaling device comprising:
(a) an activator;
(b) a signal emitter, said signal emitter to emit a primary aquatic signal comprising sound waves upon activation of said activator, said sound waves featuring a frequency in the range of about 2000 Hz to about 4500 Hz, said sound waves oscillating among two or more set frequencies in a non-random pattern, said signal emitter comprising one or more of the following: a hydrophone, a siren, a speaker, or a transducer; and
(c) an acoustic head assembly, said acoustic head assembly positioned so as to alter at least a portion of said primary aquatic signal producing a notification signal.

12. The signaling device of claim 11 further comprising an adjustable divergence attachment, said adjustable divergence attachment positioned so as to alter at least a portion of said notification signal so as to produce a user-defined notification signal.

13. The signaling device of claim 11 wherein said acoustic head assembly alters a substantial portion of said sound waves by means of an right circular cylindrical profile about which said substantial portion of said sound waves pass.

14. The signaling device of claim 11 wherein said acoustic head assembly alters a substantial portion of said sound waves by means of an concave-inwards hemi-spherical profile about which said substantial portion of said sound waves pass.

15. The signaling device of claim 11 wherein said acoustic head assembly alters a substantial portion of said sound waves by means of an concave-outwards hemi-spherical profile about which said substantial portion of said sound waves pass.

16. The signaling device of claim 11 wherein said acoustic head assembly alters a substantial portion of said sound waves by means of an acute frusta-conical profile about which said substantial portion of said sound waves pass.

17. The signaling device of claim 11 wherein said acoustic head assembly alters a substantial of said sound waves by means of an obtuse frusta-conical profile about which said substantial portion of said sound waves pass.

18. The signaling device of claim 11 further comprising a visual signal emitter, said visual signal emitter to emit a visual signal upon activation of said activator.

19. The signaling device of claim 18 wherein said visual signal features a non-random oscillating pattern similar to said non-random pattern employed for said sound waves.

20. A waterproof signaling device comprising:
(a) an activator;
(b) a signal emitter, said signal emitter to emit a primary aquatic signal comprising sound waves upon activation of said activator, said sound waves featuring a frequency in the range of about 2000 Hz to about 4500 Hz, said sound waves oscillating among two or more set frequencies in a non-random pattern, said signal emitter comprising one or more of the following: a hydrophone, a siren, a speaker, or a transducer; and
(c) an acoustic head assembly, said acoustic head assembly positioned so as to alter at least a portion of said primary aquatic signal producing a notification signal.

21. The signaling device of claim 20 further comprising an adjustable divergence attachment, said adjustable divergence attachment positioned so as to alter at least a portion of said notification signal so as to produce a user-defined notification signal.

22. The signaling device of claim 20 wherein said acoustic head assembly alters a substantial portion of said sound waves by means of an right circular cylindrical profile about which said substantial portion of said sound waves pass.

23. The signaling device of claim 20 wherein said acoustic head assembly alters a substantial portion of said sound waves by means of an concave-inwards hemi-spherical profile about which said substantial portion of said sound waves pass.

24. The signaling device of claim 20 wherein said acoustic head assembly alters a substantial portion of said sound waves by means of an concave-outwards hemi-spherical profile about which said substantial portion of said sound waves pass.

25. The signaling device of claim 20 wherein said acoustic head assembly alters a substantial portion of said sound waves by means of an acute frusta-conical profile about which said substantial portion of said sound waves pass.

26. The signaling device of claim 20 wherein said acoustic head assembly alters a substantial portion of said sound waves by means of an obtuse frusta-conical profile about which said substantial portion of said sound waves pass.

27. The signaling device of claim 20 further comprising a visual signal emitter, said visual signal emitter to emit a visual signal upon activation of said activator.

28. The signaling device of claim 27 wherein said visual signal features a non-random oscillating pattern similar to said non-random pattern employed for said sound waves.

* * * * *